(12) United States Patent
Saga (10) Patent No.: US 7,810,737 B2
(45) Date of Patent: Oct. 12, 2010

(54) RECORD REPRODUCTION APPARATUS, RECORD REPRODUCTION METHOD, RECORD REPRODUCTION PROGRAM, STORAGE MEDIUM, AND INFORMATION STORAGE MEDIUM

(75) Inventor: Yoshihiro Saga, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1456 days.

(21) Appl. No.: 11/204,829

(22) Filed: Aug. 16, 2005

(65) Prior Publication Data

US 2006/0039688 A1    Feb. 23, 2006

(30) Foreign Application Priority Data

Aug. 18, 2004   (JP)   ............................. 2004-238706

(51) Int. Cl.
*G06K 19/05* (2006.01)
(52) U.S. Cl. ...................................... 235/492; 235/385
(58) Field of Classification Search ................. 235/492, 235/375, 376, 385, 441, 487
See application file for complete search history.

(56) References Cited

U.S. PATENT DOCUMENTS

| | | | | |
|---|---|---|---|---|
| 5,576,840 A * | 11/1996 | Fukushima | ................... | 386/46 |
| 6,301,565 B1 * | 10/2001 | Goodwin, III | ............... | 705/23 |
| 6,515,704 B1 * | 2/2003 | Sato | ....................... | 348/333.11 |
| 2002/0118165 A1 * | 8/2002 | McGowan et al. | ........... | 345/156 |

FOREIGN PATENT DOCUMENTS

| | | |
|---|---|---|
| JP | 08-167269 | 6/1996 |
| JP | 2000-276871 | 10/2000 |
| JP | 2000-278573 A | 10/2000 |
| JP | 2002-190000 | 7/2002 |
| JP | 2002-245747 | 8/2002 |
| JP | 2003-331560 | 11/2003 |
| JP | 2004-040471 A | 2/2004 |

OTHER PUBLICATIONS

The above references were cited in a Dec. 15, 2009 Japanese Office Action, which is enclosed without English Translation, that issued in Japanese Patent Application No. 2004-238706.

* cited by examiner

*Primary Examiner*—Daniel St.Cyr
(74) *Attorney, Agent, or Firm*—Cowan, Liebowitz & Latman, P.C.

(57) ABSTRACT

An information storage medium includes a recording unit to record externally input data, a first display unit, and a second display unit. Control is done to display information about the data recorded in the recording unit on the first display unit, and attribute information of the information storage medium on the second display unit.

7 Claims, 12 Drawing Sheets

RECORD REPRODUCTION APPARATUS, RECORD REPRODUCTION METHOD, RECORD REPRODUCTION PROGRAM, STORAGE MEDIUM, AND INFORMATION STORAGE MEDIUM

FIELD OF THE INVENTION

The present invention relates to a record reproduction apparatus and record reproduction method and, more particularly, to a record reproduction apparatus suitable as an information device and a record reproduction method.

BACKGROUND OF THE INVENTION

Conventionally, an information storage medium such as a memory card or optical recording disk capable of saving information is detachably installed in a digital still camera or digital video camera.

Information saved in such an information storage medium is electronic data such as an electronic file. The information storage medium cannot make information saved in it visible by itself. To see the information saved in the information storage medium, an apparatus such as a camera or personal computer (PC), which can read and display the information saved in the information storage medium, must be used.

Some information storage media have a display unit (label) to display, e.g., the index of saved image data or the remaining capacity of the information storage medium (e.g., Japanese Patent Laid-Open No. 2002-245747). A memory card having a rewritable display unit (label) is also available (e.g., Japanese Patent Laid-Open No. 2003-331560).

An information storage medium having such a display unit (label) visibly displays saved information. Hence, the information storage medium can make information saved in it or its remaining capacity visible by itself.

In the information storage medium having a display unit, however, when saved information contents are rewritten, and the display contents of the display unit are not rewritten, a problem is posed. That is, the information contents saved in the information storage medium do not match the display contents of the display unit. For this reason, a user who determines the information contents saved in the information storage medium on the basis of the display contents of the display unit erroneously recognizes the information contents saved in the information storage medium. That is, the information saved in the information storage medium cannot be recognized in itself.

Additionally, when the rewrite of information contents is frequently done, the display unit (label) memorized by the user does not match the display unit (label) actually displayed by the information storage medium at a high probability. Especially when one user handles a plurality of information storage media, he/she cannot identify each medium at a high probability.

Even when the information storage medium has a rewritable display unit, the display unit is invisible when the information storage medium is installed in a device. The medium is inconvenient because the user cannot identify the information storage medium currently in use.

Furthermore, even when the information storage medium has a rewritable display unit, it may be difficult for a user who uses a plurality of media to identify each medium.

SUMMARY OF THE INVENTION

It is an object of the present invention to provide an information storage medium on which a user can know both information contents saved in the information storage medium and the identification information of the medium, and an information display method of the information storage medium.

It is another object of the present invention to provide a record reproduction apparatus and record reproduction method capable of preventing any mismatching between information contents saved in an information storage medium and the display contents of a display unit.

According to an aspect of the present invention, there is provided an information storage medium comprising: recording means for recording externally input data; first display means; second display means; and display control means for controlling to display information about the data recorded in the recording means on the first display means and attribute information of the information storage medium on the second display means.

According to another aspect of the present invention, there is provided an information display method of an information storage medium including recording means for recording externally input data, first display means, and second display means, comprising: a first display control step of controlling to display information about the data recorded in the recording means on the first display means; and a second display control step of controlling to display attribute information of the information storage medium on the second display means.

According to another aspect of the present invention, there is provided a record reproduction apparatus in which an information storage medium is detachably installed, the information storage medium including a recording unit to record information, a display unit to display data about the information, and rewrite means for rewriting the data displayed on the display unit, comprising: information transfer means for transferring predetermined information to the information storage medium; control means for controlling the rewrite means to rewrite the data displayed on the display unit on the basis of the transferred information; image sensing means for generating image data; and bitmap data generation means for generating bitmap data on the basis of the generated image data, wherein the information transfer means transfers the generated image data and the generated bitmap data to the information storage medium every time the image data is generated, and the control means controls the rewrite means so as to rewrite the data displayed on the display unit to the transferred bitmap data.

According to another aspect of the present invention, there is provided a record reproduction method of a record reproduction apparatus in which an information storage medium is detachably installed, the information storage medium including a recording unit to record information, a display unit to display data about the information, rewrite means for rewriting the data displayed on the display unit, and image sensing means for generating image data, comprising: an information transfer step of transferring predetermined information to the information storage medium; and a control step of controlling the rewrite means to rewrite the data displayed on the display unit on the basis of the transferred information, wherein in the information transfer step, the generated image data and bitmap data generated on the basis of the image data are transferred to the information storage medium every time the image data is generated, and in the control step, the rewrite means is controlled to rewrite the data displayed on the display unit to the transferred bitmap data.

According to another aspect of the present invention, there is provided a record reproduction program which executes record reproduction by a record reproduction apparatus in which an information storage medium is detachably installed, the information storage medium including a recording unit to record information, a display unit to display data about the information, rewrite means for rewriting the data displayed on the display unit, and image sensing means for generating image data, the program causing a computer to execute: an information transfer module for transferring predetermined information to the information storage medium; and a control module for controlling the rewrite means to rewrite the data displayed on the display unit on the basis of the transferred information, wherein the information transfer module transfers the generated image data and bitmap data generated on the basis of the image data to the information storage medium every time the image data is generated, and the control module controls the rewrite means to rewrite the data displayed on the display unit to the transferred bitmap data.

According to another aspect of the present invention, there is provided an information storage medium including a recording unit to record information, a display unit to display data about the information, and rewrite means for rewriting the data displayed on the display unit, comprising: output means for outputting any one of presence/absence of the display unit, the number of display units, and a data size displayable by the display unit.

According to another aspect of the present invention, there is provided an information storage medium including a recording unit to record information for each block, a display unit to display data about the information, and rewrite means for rewriting the data displayed on the display unit, comprising: information transfer means for transferring the information recorded in the recording unit to the display unit for each block.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are perspective views of an information storage medium according to an embodiment of the present invention, in which FIG. 1A shows the medium viewed from the obverse side, and FIG. 1B shows the medium viewed from the reverse side;

DETAILED DESCRIPTION OF THE PREFERRED EMBODIMENT

A preferred embodiment of the present invention will now be described in detail in accordance with the accompanying drawings.

Figure 1A:
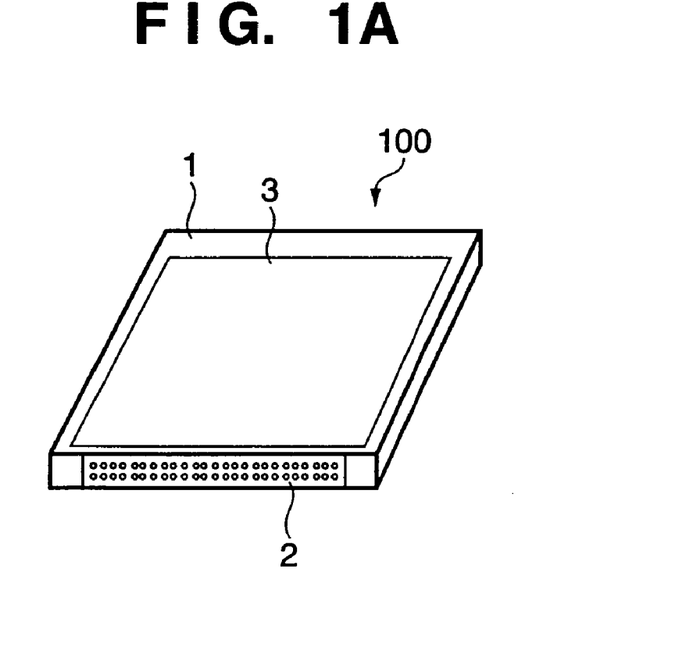
Figure 1B:
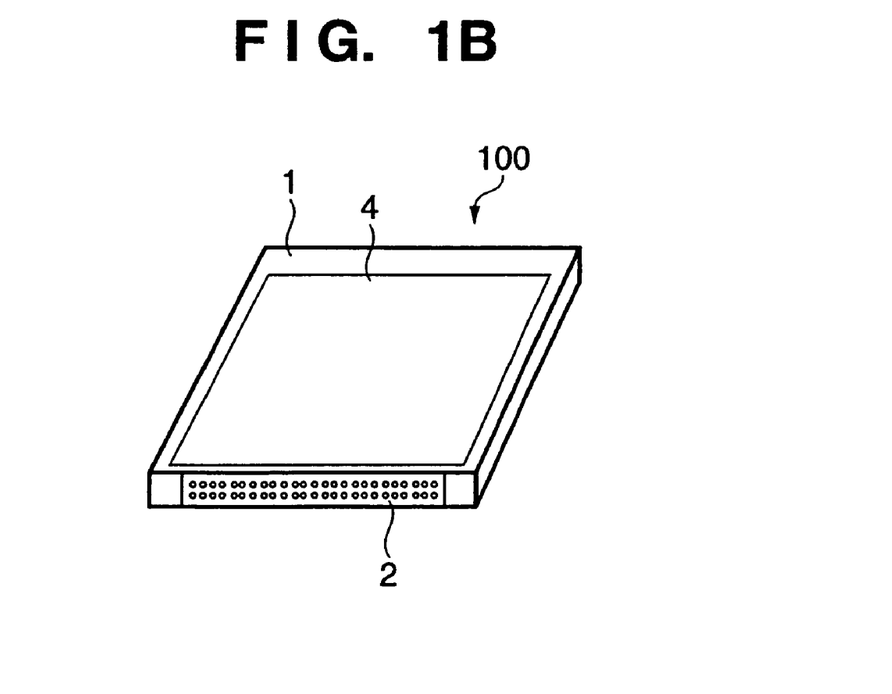

FIGS. 1A and 1B are perspective views of an information storage medium according to an embodiment of the present invention, in which FIG. 1A shows the medium viewed from the obverse side, and FIG. 1B shows the medium viewed from the reverse side.

Referring to FIGS. 1A and 1B, a memory card 100 is an example of the information storage medium according to the embodiment of the present invention. The memory card 100 has a card case 1, and a connector 2 which is arranged on a side surface of the card case 1 and electrically connected to a digital camera 500 shown in FIG. 3 (to be described later) serving as a host apparatus. The memory card 100 also comprises a display unit (label) 3 (FIG. 1A) arranged on the obverse side of the card case 1, and a display unit (label) 4 (FIG. 1B) arranged on the reverse side of the card case 1.

The card case 1 incorporates a nonvolatile recording device such as a flash memory and a controller. The display units 3 and 4 are rewritable display devices formed from electronic paper or a liquid crystal display device.

The memory card 100 receives a signal to execute information recording from the digital camera 500 through the connector 2.

Figure 2:
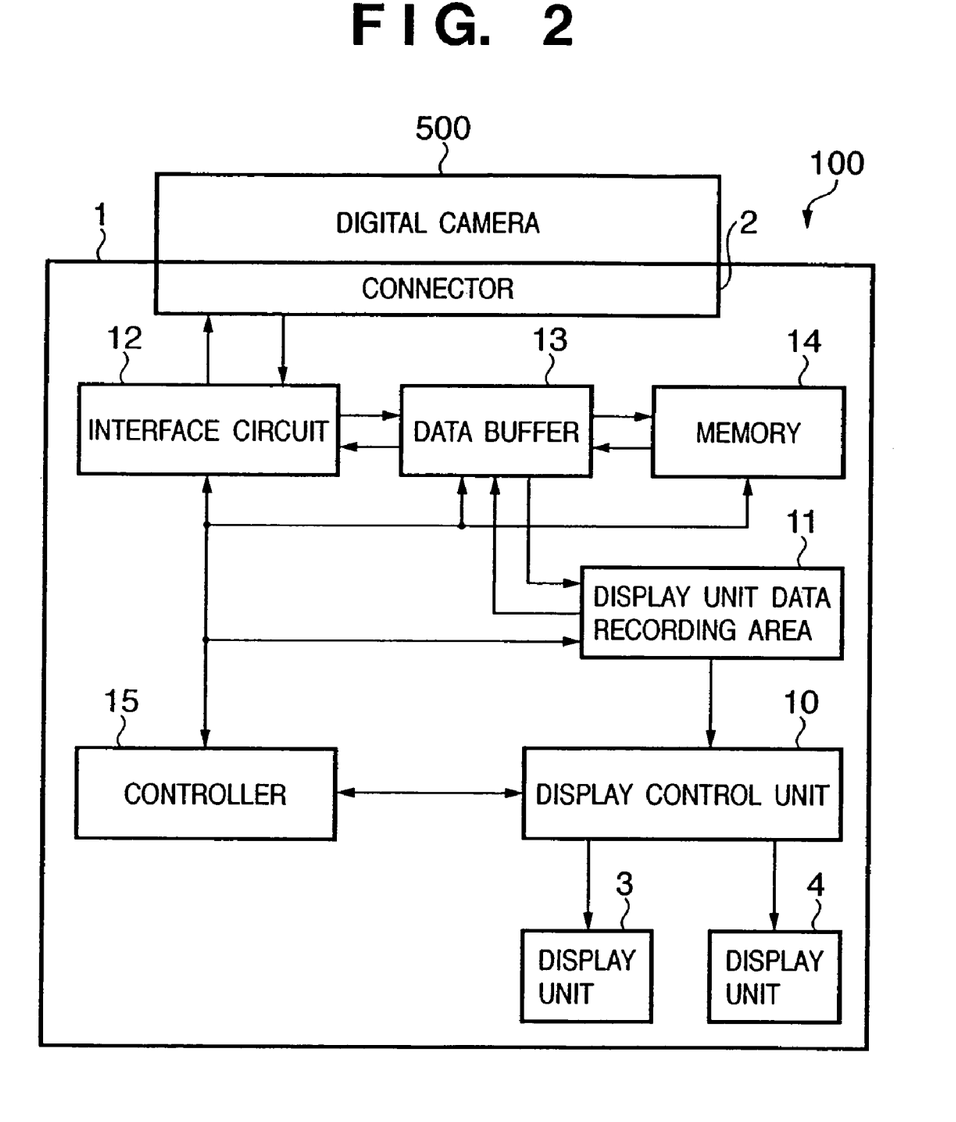
FIG. 2 is a block diagram schematically showing the internal structure of a memory card shown in FIGS. 1A and 1B.

FIG. 2 is a block diagram schematically showing the internal structure of the memory card shown in FIGS. 1A and 1B.

Referring to FIG. 2, the memory card 100 comprises an interface circuit 12 connected to the connector 2 arranged on a side of the card case 1. The memory card 100 also comprises a display unit data recording area (recording unit) 11, data buffer 13, memory 14, and controller 15, which are connected to the interface circuit 12, a display control unit (rewrite means) 10 which is connected to the display unit data recording area 11 and controller 15, and the display units 3 and 4 which are connected to the display control unit 10. The display unit data recording area 11, interface circuit 12, and memory 14 are connected to the data buffer 13.

The interface circuit 12 transmits data between the digital camera 500 and the data buffer 13 and also transmits a control signal between the digital camera 500 and the controller 15. The controller 15 interprets a command received from the digital camera 500 through the connector 2 and interface circuit 12 and controls the data buffer 13 and memory 14. Under this control, data received from the digital camera 500 is written in the memory 14, and data recorded in the memory 14 is output to the digital camera 500. As the command or data communication method, a protocol defined by a standard such as ATA or SD is used.

Figure 3:
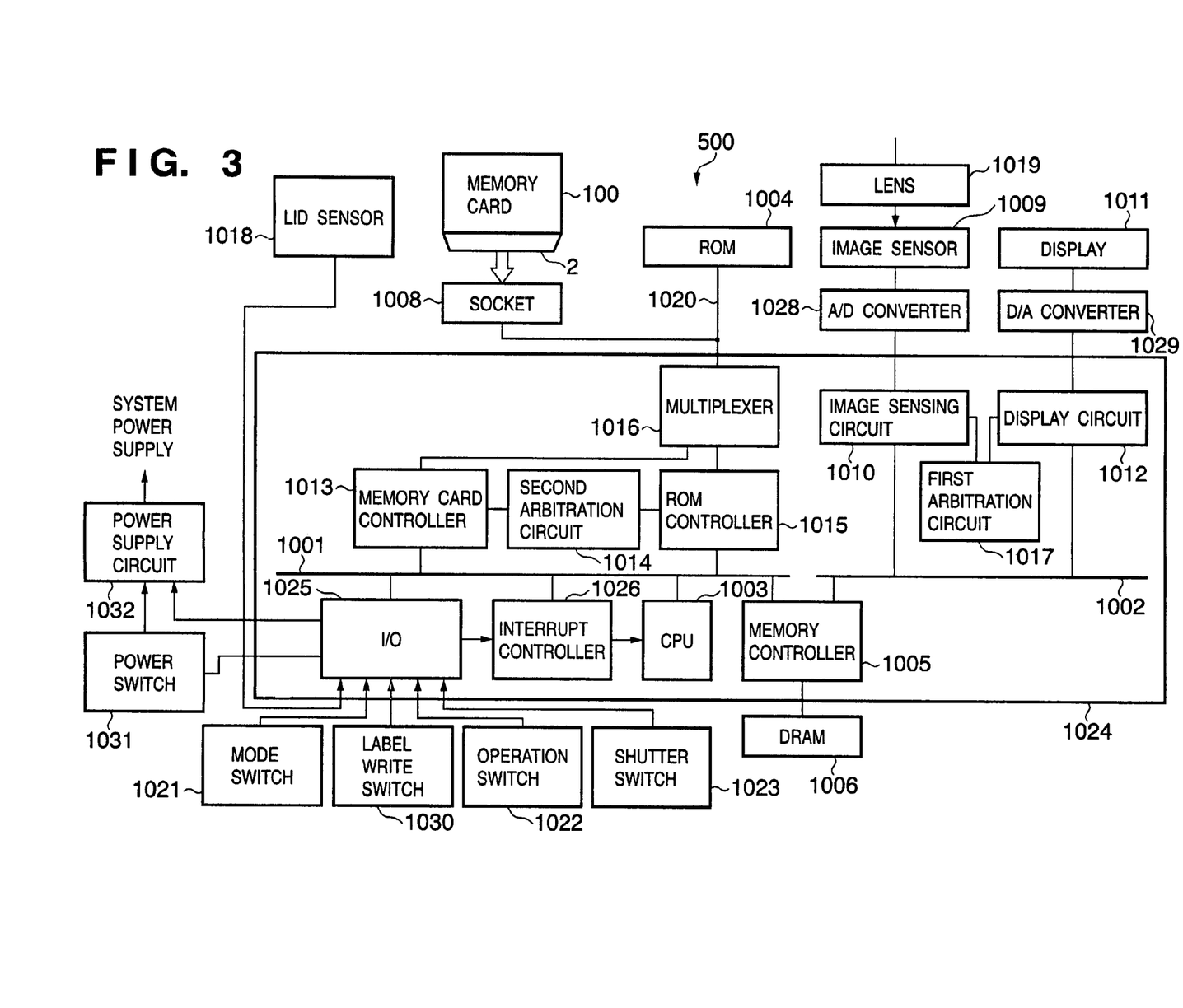
FIG. 3 is a block diagram schematically showing the arrangement of a record reproduction apparatus according to the embodiment of the present invention.

FIG. 3 is a block diagram schematically showing the arrangement of the digital camera 500 serving as a record reproduction apparatus according to the embodiment of the present invention.

Referring to FIG. 3, a lens 1019 forms an image of an object. An image sensor 1009 outputs the object image formed by the lens 1019 as analog image data. A display 1011 displays the analog image data as an image. The connector 2 of the memory card 100 is detachably connected to a socket 1008. A ROM 1004 stores the program of the operation of the digital camera 500. A DRAM 1006 holds work data for a CPU 1003 (to be described later) in executing a program and also image data generated by the image sensing operation of the digital camera 500 or image data to be displayed on the display 1011. A power supply circuit 1032 supplies a power from the system power supply to the entire digital camera 500. A digital camera system LSI 1024 will be described later. The ROM 1004 and socket 1008 are connected to a ROM data bus 1020.

A mode switch 1021 is used by the user to designate the operation mode of the digital camera 500, i.e., the image sensing mode or reproduction mode. A label write switch 1030 is used to execute an operation related to the write in the display units 3 and 4 of the memory card 100. An operation switch 1022 includes a plurality of switches such as arrow keys, set button, and cancel button which are used by the user to input an instruction to the digital camera 500. A shutter switch 1023 instructs the start of image sensing in the image sensing mode. A lid sensor 1018 determines whether the lid of a portion to receive the memory card 100 is open. A power switch 1031 determines the power ON/OFF of the digital camera 500. The power switch 1031 is connected to the power supply circuit 1032.

In the digital camera system LSI 1024, an image sensing circuit 1010 is connected to the image sensor 1009 through an A/D converter 1028 to generate digital image data on the basis of analog image data output from the image sensor 1009. A display circuit 1012 generates digital image data to be displayed on the display 1011 from digital image data in the DRAM 1006. The digital camera 500 further includes a first arbitration circuit 1017 connected to the image sensing circuit 1010 and display circuit 1012, and a D/A converter 1029 which converts the generated digital image data into analog image data and outputs it. The image sensing circuit 1010 and display circuit 1012 are connected to each other through an image data bus 1002.

A memory card controller 1013 and ROM controller 1015 are connected to the ROM data bus 1020 through a multiplexer 1016. A second arbitration circuit 1014 is connected between the memory card controller 1013 and the ROM controller 1015. An IO 1025, interrupt controller 1026, and CPU 1003 are connected in series. These components are connected to each other through a CPU data bus 1001.

The digital camera system LSI 1024 also comprises a memory controller 1005 which is connected to the DRAM 1006 and connects the CPU data bus 1001 to the image data bus 1002.

The mode switch 1021, label write switch 1030, operation switch 1022, shutter switch 1023, lid sensor 1018, and power switch 1031 are connected to the IO 1025 in the digital camera system LSI 1024.

The memory card controller 1013 issues a command and transfers data to the memory card 100. Since a command issued to the memory card 100 is defined by a number allowed by the bit width of the data line, the memory card controller 1013 is designed to transmit a number representing a command.

The first arbitration circuit 1017 arbitrates a request of data transfer from the image sensing circuit 1010 serving as a bus master and the display circuit 1012.

The image data bus 1002 transmits image data in sensing or reproducing an image in accordance with a request from the image sensing circuit 1010 serving as a bus master and the display circuit 1012.

The second arbitration circuit 1014 gives a bus use right to one of the memory card controller 1013 and ROM controller 1015. The memory card controller 1013 or ROM controller 1015 which obtains the bus use right can use the ROM data bus 1020 through the multiplexer 1016. The ROM controller 1015 can access the ROM 1004, and the memory card controller 1013 can access the memory card 100.

The CPU data bus 1001 transmits data or control signal in accordance with a request from the CPU 1003 in association with the operation executed by the CPU 1003 serving as a bus master.

The memory controller 1005 receives access requests to the DRAM 1006 from the CPU data bus 1001 and image data bus 1002 and generates an access signal to the DRAM 1006 while arbitrating the requests. The memory controller 1005 executes a data write in the DRAM 1006 or data read from the DRAM 1006.

The interrupt controller 1026 processes an interrupt request signal input from each module in the digital camera 500 on the basis of a preset set value and outputs the interrupt request signal.

The CPU 1003 whose interrupt request input terminal is connected to the output from the interrupt controller 1026 controls the sequence of the camera.

The digital camera 500 can generate an interrupt request from each unit of the system to the CPU 1003. For example, when the lid sensor 1018 detects that the lid is open, an interrupt request signal can be generated to the CPU 1003 in accordance with the detection.

The power supply circuit 1032 is controlled by the IO 1025 and power switch 1031. While the power switch 1031 is pressed, or a signal supplied from the IO 1025 is enabled, the power is supplied from the system power supply to the entire digital camera 500.

For example, when the power switch 1031 is pressed in the power OFF state, the power supply circuit 1032 supplies the power to the entire digital camera 500 while the power switch 1031 is pressed. When the power is ON, the interrupt controller 1026 immediately enables the control signal to the power supply circuit 1032. Hence, even when the user stops pressing the power switch 1031, the digital camera 500 holds the power ON state. When the power switch 1031 is pressed again in the power ON state, the digital camera 500 executes shutdown processing. When the processing is ended, the control signal is disabled. Hence, the power to the digital camera 500 is stopped.

In the data write, the digital camera 500 issues a write command to the memory card 100 while designating a logic block address and a transfer block count. At this time, the controller 15 records data, which is received from the digital camera 500 and written in the data buffer 13, in an area of the memory 14 corresponding to the designated logic block address.

In the data read, the digital camera 500 issues a read command to the memory card 100 while designating a logic block address and a transfer block count. At this time, the controller 15 transfers data, which is recorded in an area of the memory 14 corresponding to the designated logic block address, to the data buffer 13 and outputs the transferred data to the digital camera 500 through the connector 2.

The memory card 100 receives a device recognition command from the digital camera 500 and outputs, to the digital camera 500, information about the function provided in the memory card 100. For example, pieces of information representing the size of a writable data area and whether a defined control mode is supported are output to the digital camera 500, like a conventional memory card. Not only these pieces of information but also pieces of information about the display units 3 and 4 such as the presence/absence information of the rewritable display units 3 and 4, label count information (two in this embodiment), and label size information (e.g., the number of vertical dots and the number of horizontal dots) are output.

The digital camera 500 executes label recognition processing in FIG. 4 and label write processing in FIG. 5 (both will be described later).

Figure 4:
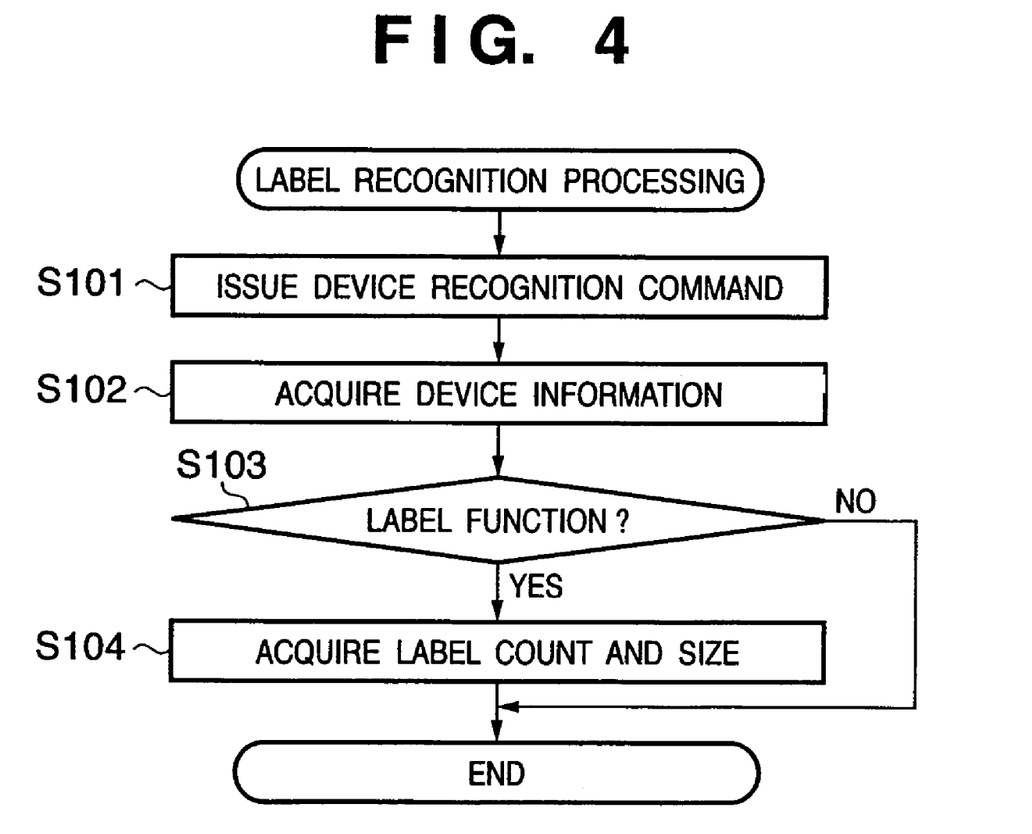
FIG. 4 is a flowchart showing the procedures of label recognition processing executed by a digital camera shown in FIG. 3.

FIG. 4 is a flowchart showing the procedures of label recognition processing executed by the digital camera shown in FIG. 3.

Referring to FIG. 4, to check whether the installed memory card 100 has a label function, the digital camera 500 issues a device recognition command to the memory card 100 (step S101). The device information of the memory card 100, which is output from the memory card 100, is acquired (step S102). It is determined whether the acquired device information contains an item related to the label function (step S103). If YES in step S103, label count information and label size information are acquired (step S104), and the processing is ended. If NO in step S103, step S104 is skipped, and the processing is ended.

Figure 5:
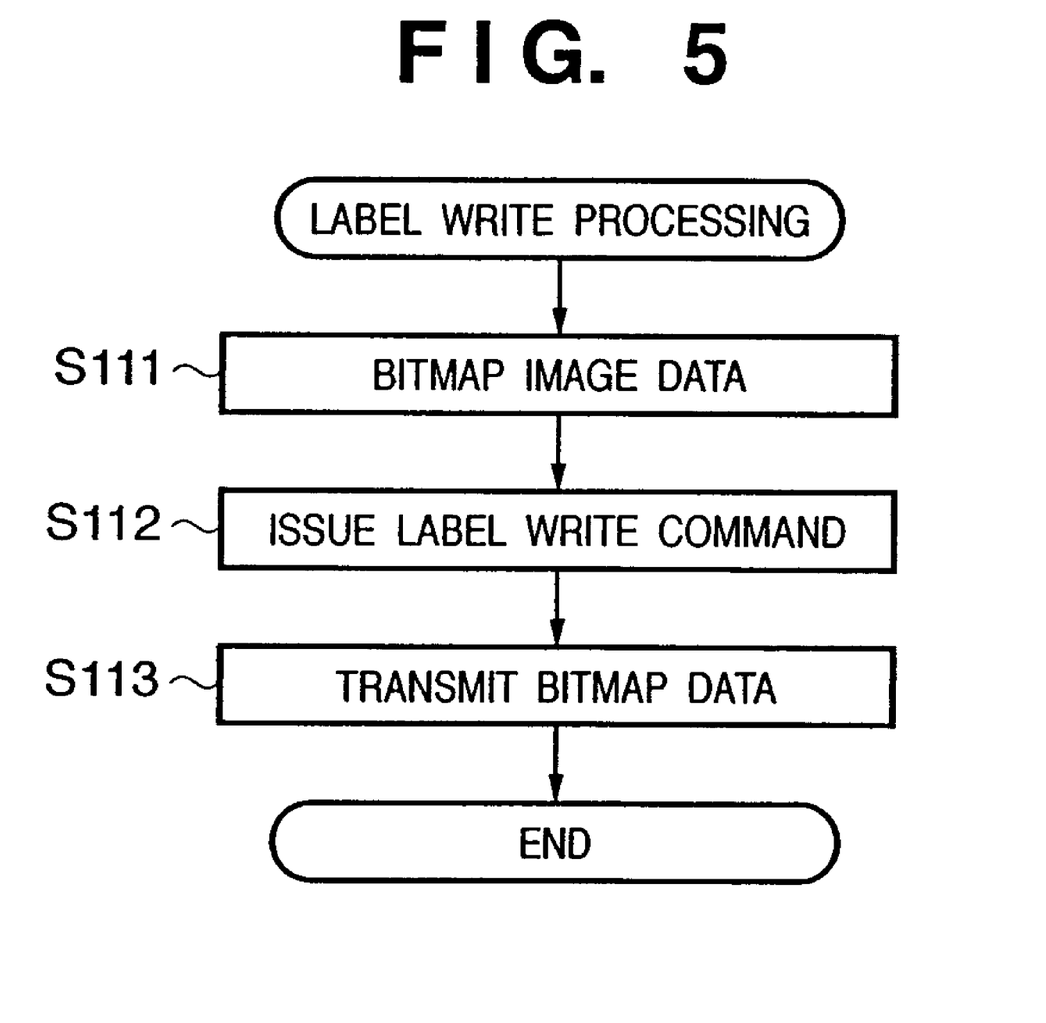
FIG. 5 is a flowchart showing the procedures of label write processing executed by the digital camera shown in FIG. 3.

FIG. 5 is a flowchart showing the procedures of label write processing executed by the digital camera shown in FIG. 3.

This processing is executed for the memory card 100 having a label area only when it is determined in step S103 of the label recognition processing in FIG. 4 that the memory card has a label function.

Referring to FIG. 5, the digital camera 500 bitmaps image data to be written in the display units 3 and 4 (step S111). A label write command is issued (step S112). All bitmap data are transmitted (step S113) (information transfer means), and the processing is ended.

Upon receiving the label write command from the digital camera 500, the memory card 100 records, in the display unit data recording area 11, the bitmap data received from the digital camera 500. The display control unit 10 controls the display units 3 and 4 to cause them to display, as label images, bitmap data written in the display unit data recording area 11 (control means).

For record reproduction in the display units 3 and 4, the memory card 100 uses an interface and protocol for normal data record reproduction. The data bus of the memory card 100 includes 16-bit data lines, address lines, and control signal lines. No access-dedicated signals to the rewritable display units 3 and 4 are used.

The total number of dots of the display unit 3 or 4 is an integer multiple (n) of the block size of bitmap image data written in the display unit data recording area 11. This is because many digital cameras 500 have a direct memory access (DMA) channel and use the block size as the unit of data transfer. The total number of dots of the display unit 3 or 4 is set to an integer multiple of the block size of bitmap data. The unit of data transfer to the display unit 3 or 4 is set to an integer multiple of the block size of bitmap data. With this arrangement, the digital camera 500 can transfer bitmap data to the memory card 100 by a normal data write method.

As described above, the memory card 100 expand the device information for the label recognition command and displays the label count and label size. When the label size is set to an integer multiple of the block size of bitmap data written in the display unit data recording area 11, data transfer can be done by using the conventional digital camera 500 or an outdated PC. When a label write command issue program is added to the control program of the conventional digital camera 500 or outdated PC, the write in the display units 3 and 4 can be executed. Hence, even the conventional digital camera 500 or outdated PC can rewrite the display units 3 and 4 by adding the issue program.

Another method of data transfer to display units 3 and 4 will be described below.

In the memory card 100, memory areas and label information areas are arranged to predetermined logic block addresses. In the label write, a logic block address is designated, and the write is executed by a normal write command. In this case, the compatibility of the memory card 100 can be maintained. In addition, when the label information area is formed from a nonvolatile memory, the label information area can be used as a data recording area.

When the user has a plurality of memory cards 100, he/she must recognize each memory card 100. However, when the rewrite of the display units 3 and 4 is frequently done, it is difficult to discriminate the memory cards 100. Hence, no rewrite portion is preferably provided in the display units 3 and 4. For example, in the memory card 100 of this embodiment, a thumbnail image is displayed on the obverse side (FIG. 1A), and the brand and recording capacity of the memory card 100 is displayed on the reverse side (FIG. 1B).

Information to recognize each memory card 100 is preferably displayed on the reverse surface of the card. For example, different colors are set to the respective memory cards 100. The color is written in part of the reverse surface of the label. Then, control is executed not to rewrite the portion. With this arrangement, the user can identify each memory card 100.

Rewrite processing of the display units 3 and 4 of the digital camera 500 will be described below.

For rewrite processing of the display units 3 and 4, the digital camera 500 is designed to select one of the following three modes and set the selected mode.

(1) Mode Wherein Label Write is Executed in Every Image Sensing

When label write is executed in every image sensing, the display units 3 and 4 of the memory card 100 display latest information contents saved in the memory card 100. The user can easily collate the display units 3 and 4 of the memory card 100 with the latest information contents saved in the memory card 100. Hence, he/she can easily recognize image files contained in the memory card 100.

Figure 6:
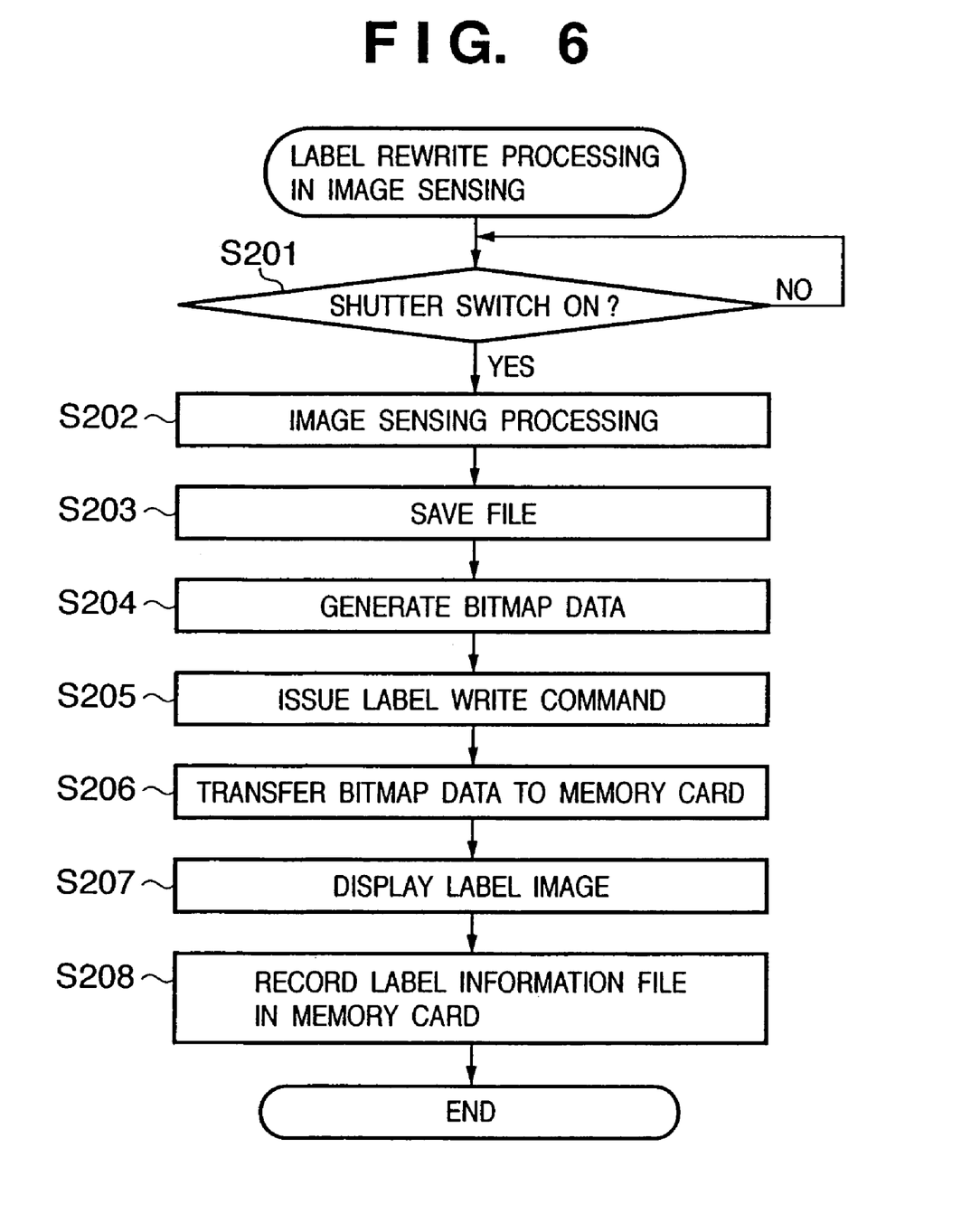
FIG. 6 is a flowchart showing the procedures of label rewrite processing executed in image sensing by the digital camera shown in FIG. 3.

FIG. 6 is a flowchart showing the procedures of label rewrite processing executed in image sensing by the digital camera shown in FIG. 3.

Referring to FIG. 6, before the start of label rewrite processing, the digital camera 500 issues a device recognition command to the memory card 100, acquires information about the presence and size of the display units 3 and 4, and records the information in the DRAM 1006.

The digital camera 500 determines whether the shutter switch 1023 is pressed (step S201). If YES in step S201, the image sensing circuit 1010 is activated to start image sensing processing (step S202). Image data generated from an object image formed by the image sensor 1009 is recorded in the DRAM 1006. The memory card controller 1013 is activated to transfer the generated image data to the memory card 100 through a DMA (direct memory access) circuit (information transfer means). In this way, the generated image data is recorded in the memory card 100 as a file (step S203).

The digital camera 500 thins out the generated image data to generate bitmap image data corresponding to the label size acquired in advance. The file name, the file generation date/time, and the remaining capacity of the memory card 100 are bitmapped and arranged to generate one bitmap data (step S204) (bitmap data generation means). A label write command is issued to the memory card 100 (step S205). The generated bitmap data is transferred to the memory card 100 (step S206) (information transfer means). The display circuit 1012 is activated. The images (to be referred to as label images hereinafter) of the display units 3 and 4 are displayed on the display 1011 (step S207). A file (to be referred to as a label information file hereinafter) containing the name of the image file used to generate the label images is recorded in the memory card 100 (step S208). The processing in steps S201 to S208 is repeated, and the processing is ended.

According to the processing in FIG. 6, the user can easily collate the display units 3 and 4 of the memory card 100 with the latest information contents in the memory card 100. Hence, he/she can easily recognize image files contained in the memory card 100.

In this processing, the label rewrite of the memory card is executed every time image sensing is executed. There is also a situation such as continuous shooting wherein image file generation is repeatedly executed during a predetermined period. In this case, even when the label is rewritten immediately after image sensing, the label must always be rewritten again in the next image sensing. Hence, the operation of rewriting the label in every image sensing is wasteful.

In this case, for, e.g., continuous shooting, the label rewrite is not executed in image sensing executed while the shutter switch is pressed. Only in image sensing executed finally after the shutter switch is released, the label of the memory card is rewritten.

(2) Mode Wherein Label Write is Executed When Power is Turned Off or Lid of Memory Card 100 is Opened In the mode wherein the label write is executed in every image sensing, when the user continuously senses images, the label information write in the memory card 100 takes a long time, and the time until the next image sensing enable state becomes long. Hence, the user may miss a shutter chance.

This problem can be solved by causing the digital camera 500 to execute shut-down processing in FIG. 7 (to be described later) and the label information write only when removal of the memory card 100 is expected, or the lid of the memory card 100 is opened.

Figure 7:
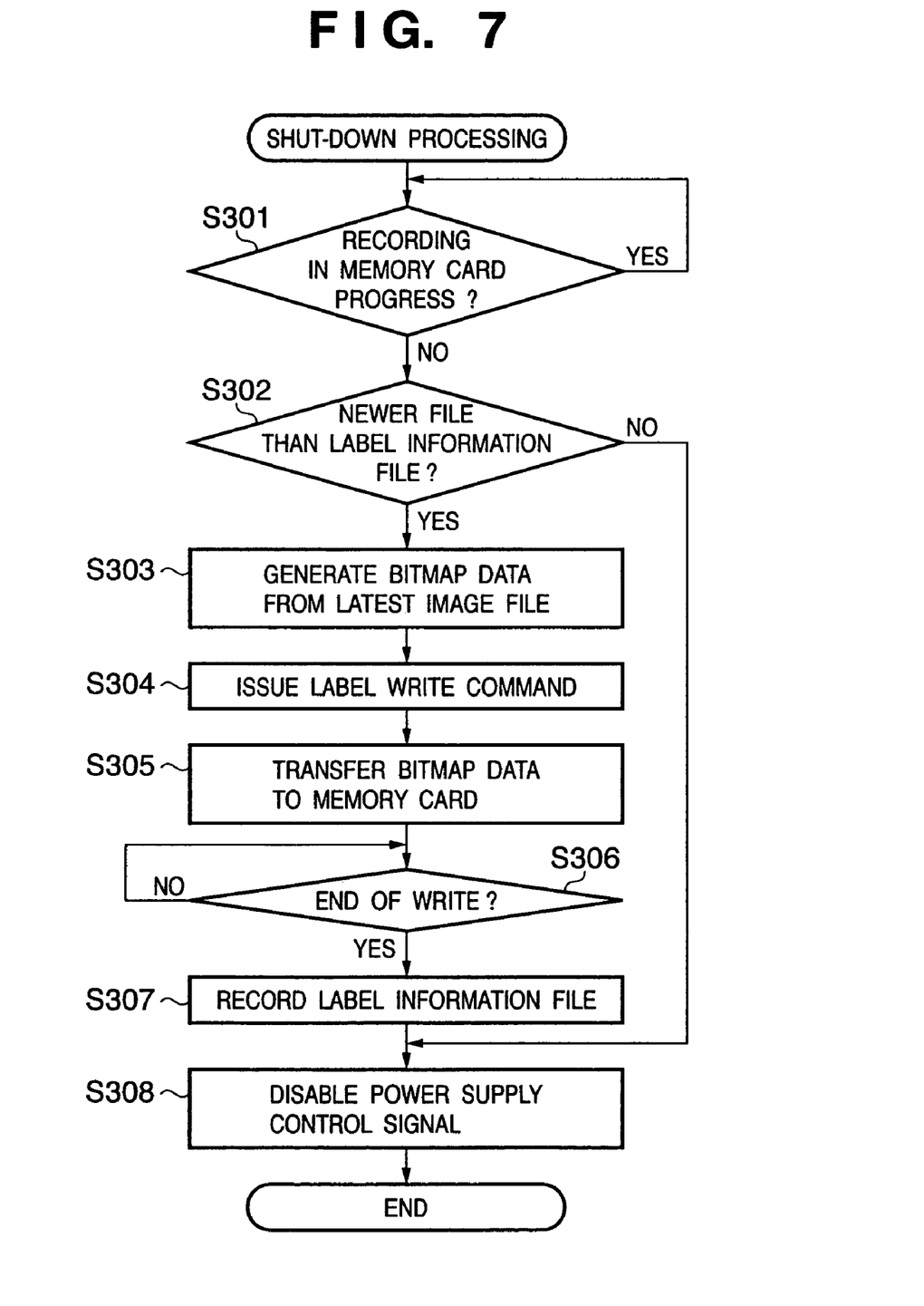
FIG. 7 is a flowchart showing the procedures of shut-down processing executed by the digital camera shown in FIG. 3.

FIG. 7 is a flowchart showing the procedures of shut-down processing executed by the digital camera shown in FIG. 3.

When the power switch 1031 is pressed in the power supply state, or when the lid of the memory card 100 is opened, and the lid sensor 1018 detects that the lid is open, the digital camera 500 starts shut-down processing shown in FIG. 7.

Referring to FIG. 7, the digital camera 500 determines whether the write in the memory card 100 is progressing (data record in the memory card 100 is being executed) (step S301). If YES in step S301, after the end of the write, the latest one of image files recorded in the memory card 100 is detected and collated with the label information file. With this operation, it is determined whether an image file newer than the label information file is recorded in the memory card 100 (step S302). If an image file newer (generated later) than the label information file is recorded, image data saved in the latest image file is bitmapped in the DRAM 1006, and pixels are thinned out to generate a thumbnail image. Characters representing the file name, the file generation date/time, and the remaining capacity of the memory card 100 are bitmapped in accordance with the generated thumbnail image to generate one bitmap data in the label size read in advance (step S303).

The digital camera 500 issues a label write command to the memory card 100 (step S304). The generated bitmap data is transferred to the memory card 100 (step S305). It is determined whether transfer (write) is ended (step S306). The file name of the label information file is updated to the file name of the image file used to generate the label image and recorded in the memory card 100 (step S307). Then, the power control signal is disabled to cut off the power and stop the operation (step S308), and the processing is ended.

If the digital camera 500 determines in step S302 that no file is obtained later than the label image, the processing in steps S303 to S307 is skipped. The power control signal is disabled to cut off the power and stop the operation (step S308), and the processing is ended.

According to the processing in FIG. 7, even when the user continuously senses images, he/she can be prevented from missing any shutter chance.

(3) Mode Wherein Label Write is Executed by User's Operation in Reproduction

The label image is used by the user to discriminate the memory card 100. Hence, the label image is sometimes preferably written in accordance with a user's intention.

When the user wants to rewrite the label image by his/her own will, the digital camera 500 is set in the mode wherein the label write is executed by the user's operation in reproduction. That is, the mode switch 1021 is set to the reproduction mode. Reproduction mode processing shown in FIG. 8 (to be described later) to display a sensed image on the display 1011 is executed.

Figure 8:
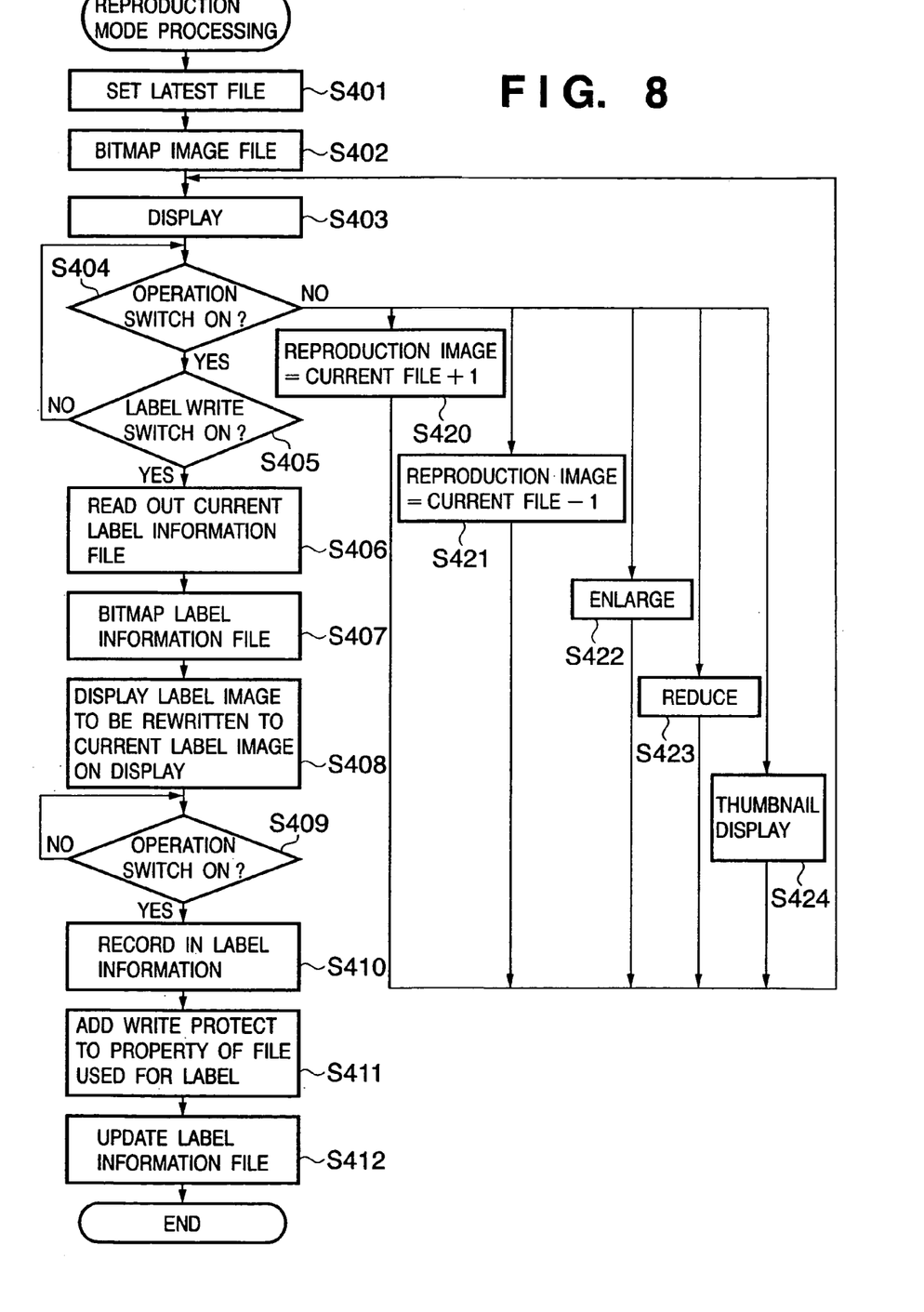
FIG. 8 is a flowchart showing the procedures of reproduction mode processing executed by the digital camera shown in FIG. 3.

FIG. 8 is a flowchart showing the procedures of reproduction mode processing executed by the digital camera shown in FIG. 3.

Referring to FIG. 8, the digital camera 500 sets the variable of the latest image file to a variable representing an image file to be reproduced (step S401) and reads out the image file indicated by the set variable. Image data saved in the readout image file is bitmapped in the DRAM 1006 (step S402). The display circuit 1012 is activated to display the bitmapped image data on the display 1011 (step S403).

Figure 9:
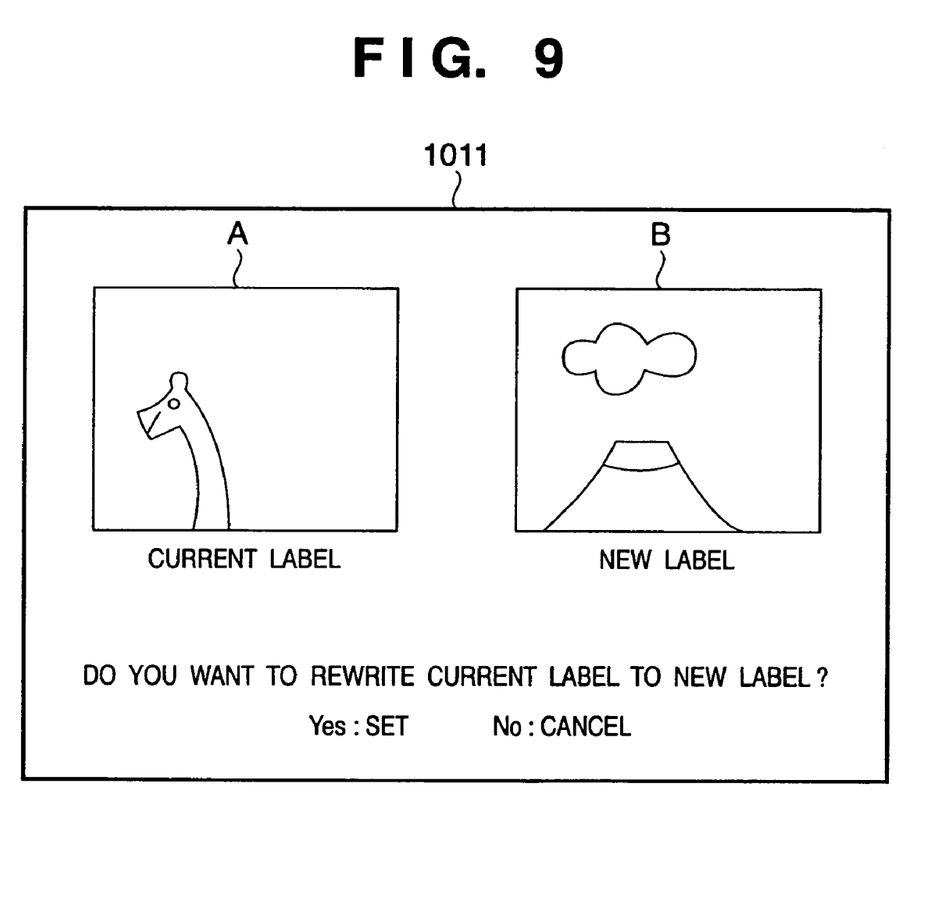
FIG. 9 is a view showing the display contents of a display which are displayed in step S408 in FIG. 8.

The digital camera 500 checks the state of the operation switch 1022 to determine whether the operation switch 1022 is pressed by the user (step S404). If YES in step S404, it is determined whether the label write switch 1030 is pressed by the user (step S405). If YES in step S405, the label information file, i.e., the file containing the name of the image file used to generate the label image is read out (step S406). Image data saved in the readout label information file is bitmapped in the DRAM 1006 (step S407). Characters representing the file name, the file generation date/time, and the remaining capacity of the memory card 100 are bitmapped in accordance with the bitmapped image data to generate bitmap data as a new label image. The label image (B in FIG. 9) to be newly recorded and the current label image (A in FIG. 9) are juxtaposed and displayed on the display 1011 (step S408). With this arrangement, the user can rewrite the label image and also recognize the current label image and the label image to be newly recorded. Hence, any recognition error of the memory card 100 caused by the label image rewrite can be prevented.

The digital camera 500 displays a message to confirm the write of the label image and determines whether the ON button of the operation switch 1022 is pressed by the user (step S409). If YES in step S409, a label record command is issued to the memory card 100 (step S410) to transfer the generated bitmap data to the memory card 100. A write protect flag is recorded in the attribute information of the file used to generate the bitmap data (step S411) (write protect setting means). The label information file is updated to the file name of the image file used to generate the label image and recorded in the memory card 100 (step S412). Then, the processing in steps S404 to S412 is repeated, and the processing is ended.

If it is determined in step S404 that the operation switch 1022 is pressed by the user, the digital camera 500 detects the state of the operation switch 1022. When the operation switch 1022 indicates "image display in forward direction", the variable representing the file to be displayed is incremented by one (step S420). When the operation switch 1022 indicates "image display in reverse direction", the variable representing the file to be displayed is decremented by one (step S421). When the operation switch 1022 indicates image enlargement, the display circuit is instructed to reduce image thinning (step S422). When the operation switch 1022 indicates image reduction, the display circuit is instructed to increase image thinning (step S423). When the operation switch indicates thumbnail display, thumbnail images are created from nine image files, and the data area arranged on the DRAM 1006 such that the nine created thumbnail images are arrayed in one window (step S424). After the processing in steps S420 to S424, the flow returns to step S403. The digital camera 500 displays the image on the display 1011 in accordance with the instruction in step S423 or S424.

According to the processing in FIG. 8, a write protect flag is recorded (step S411). Hence, even when the memory card 100 is handled by a host apparatus (e.g., PC) except the digital camera 500, the user can be prevented from carelessly erasing files. Hence, any mismatching between the label image and the file can be prevented. If the user cancels the write protect and erases the file, is suggests that mismatching occurs between the label image and the file because of the reason why the file is write-protected.

When the power is turned on, or the card is inserted, the digital camera 500 executes warning display processing shown in FIG. 10 (to be described later) to check whether mismatching between the label image and the file has occurred.

Figure 10:
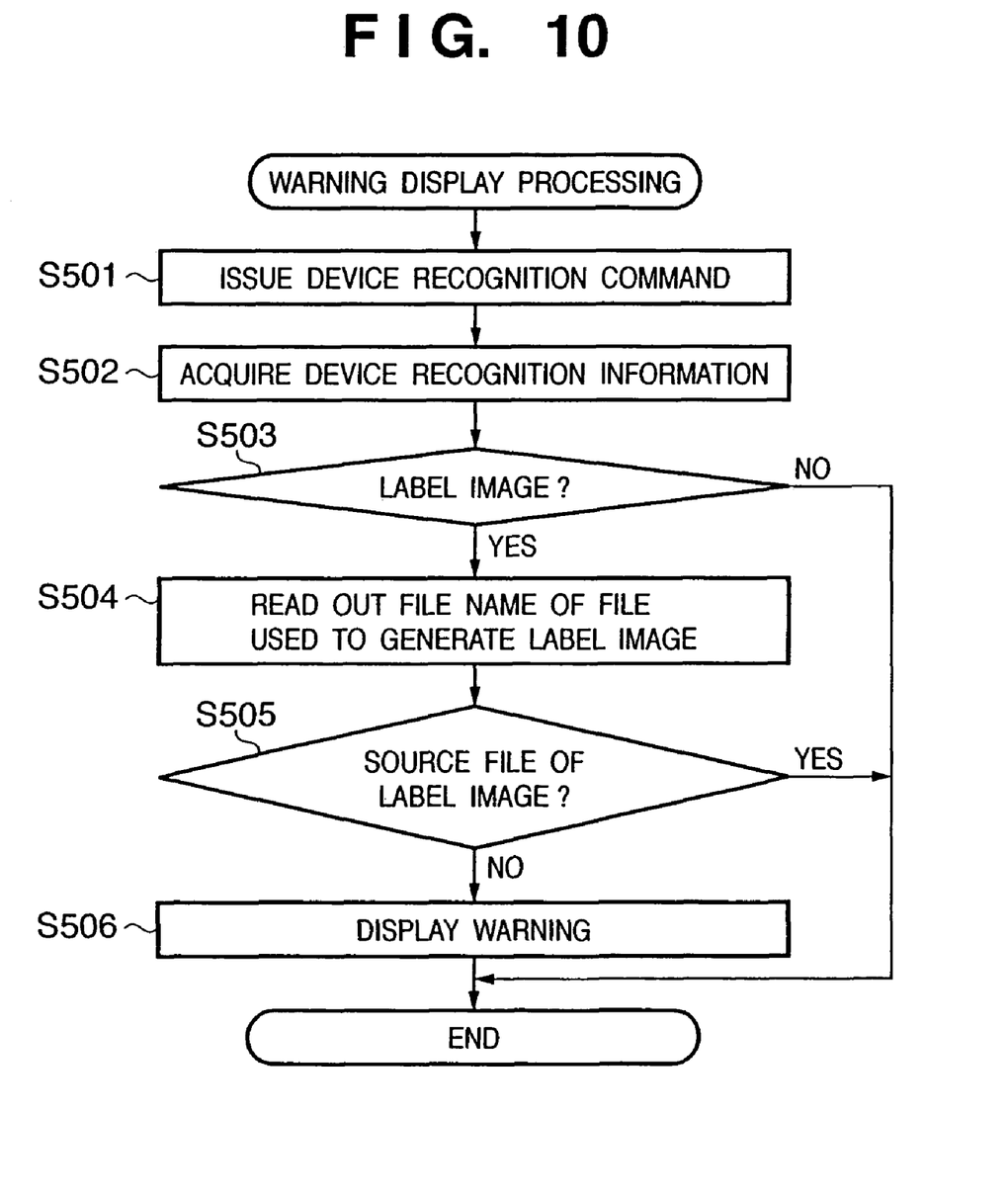
FIG. 10 is a flowchart showing the procedures of warning display processing executed by the digital camera shown in FIG. 3.

FIG. 10 is a flowchart showing the procedures of warning display processing executed by the digital camera shown in FIG. 3.

Referring to FIG. 10, when the power is turned on, or the lid of the memory card 100 is closed, the digital camera 500 issues a device recognition command (step S501). The device recognition information is read out (step S502). It is determined whether a label image is present in the display units 3 and 4 of the memory card 100 (step S503).

If YES in step S503, the file name of the file used to generate the label image is read out from the label image read out from the memory card 100 (step S504). It is determined whether the file used to generate the label image, i.e., the source image file of the label image, is recorded in the memory card 100 (step S505). If NO in step S505, a warning message representing that the file used to generate the label image is not recorded is displayed on the display 1011 (step S506), and the processing is ended. If YES in step S505, step S506 is skipped, and the processing is ended.

If NO in step S503, steps S504 to S506 are skipped, and the processing is ended.

By warning display in step S506, the user is aware that the file used to generate the label image is not recorded in the memory card 100. At this time, the user can newly write a label image in the memory card 100 by setting the mode switch 1021 to the reproduction mode and pressing the label write switch 1030 (detection means). In addition, knowing that the label image does not match the information contents in the memory card 100, the user can use the digital camera 500 without rewriting the label image.

The digital camera 500 can also erase a file by executing a file erase means shown in FIG. 11 (to be described later). However, if the file to be erased is the file of the label image displayed on the display units 3 and 4, the label image should also be erased to prevent any mismatching between the label image and the file.

Figure 11:
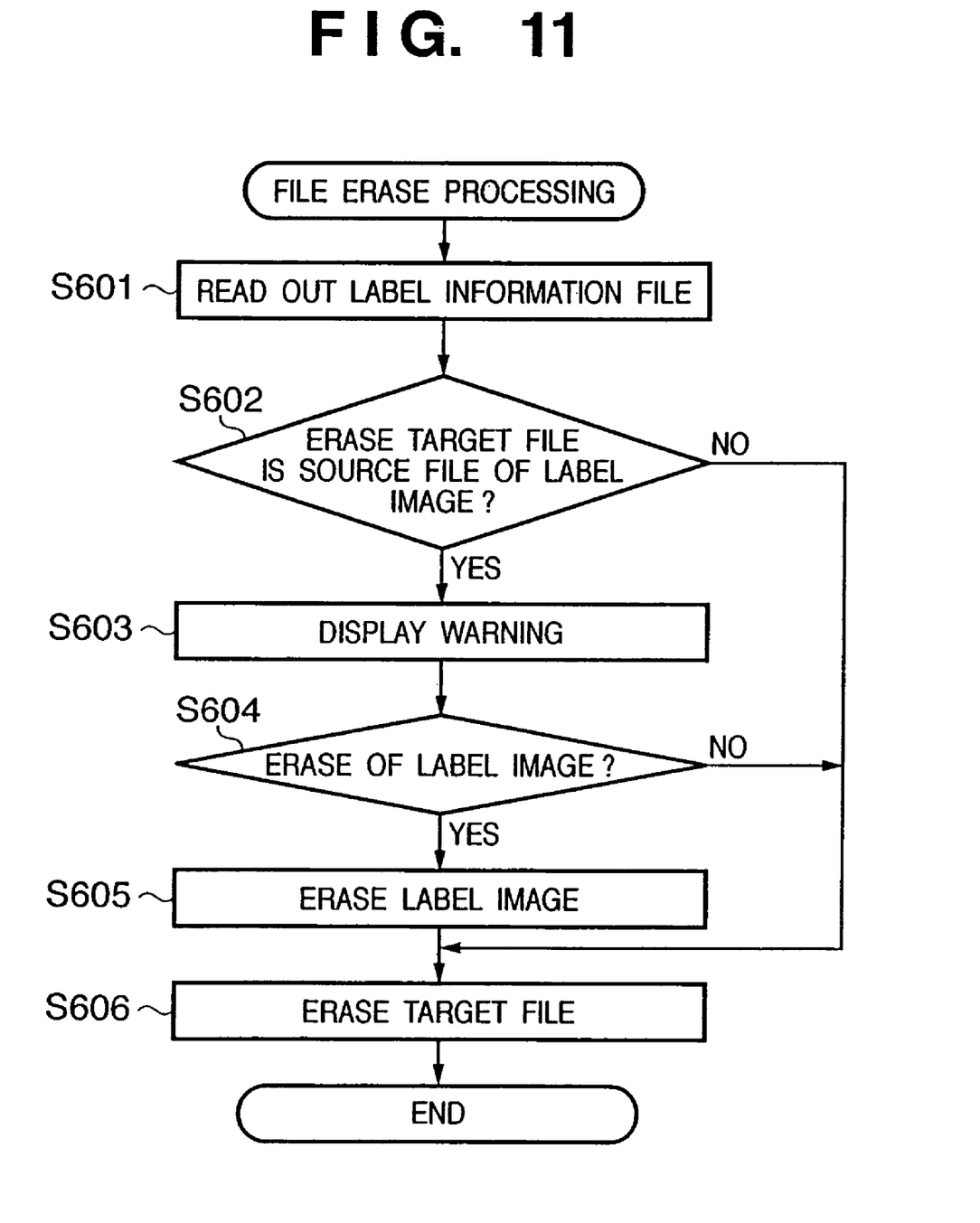
FIG. 11 is a flowchart showing the procedures of file erase processing executed by the digital camera shown in FIG. 3.

FIG. 11 is a flowchart showing the procedures of file erase processing executed by the digital camera shown in FIG. 3.

When the user instructs erase of a selected file, the digital camera 500 reads out the file name of the file used to generate the label image from the label information file (step S601). It is determined whether the file name of the file used to generate the label image (the source image file of the label image) matches the file name of the erase target file (step S602). If NO in step S602, the target file is erased (step S606) (file erase means), and the processing is ended.

If YES in step S602, the digital camera 500 displays, on the display 1011, a warning message representing that the label image will also be erased simultaneously as the file is erased (step S603) (second warning display means). The user is asked to confirm whether to erase the label image (step S604). If the user inputs acceptance to erase the label image (YES in step S604), the digital camera 500 erases the label image (step S605) (second erase means). In addition, the target file is erased (step S606), and the processing is ended. If the user does not accept erase of the label image, the digital camera 500 erases only the target file (step S606), and the processing is ended.

Erase of a single file has been described. However, the same processing as described above can be applied to erasing all files in the memory card 100 or formatting (initialization means). More specifically, the label image is erased together with the file to prevent any mismatching between the label image and the recorded file, as in the file erase processing shown in FIG. 11.

When the memory card 100 having the rewritable display units 3 and 4 is installed in the digital camera 500, the user cannot see the states of the display units 3 and 4 unless the memory card 100 is removed from the digital camera 500. For this reason, the user cannot recognize the display contents on the display units 3 and 4. To prevent this, the digital camera 500 executes label image display processing shown in FIG. 12 (to be described later) to display the label image on the display 1011.

Figure 12:
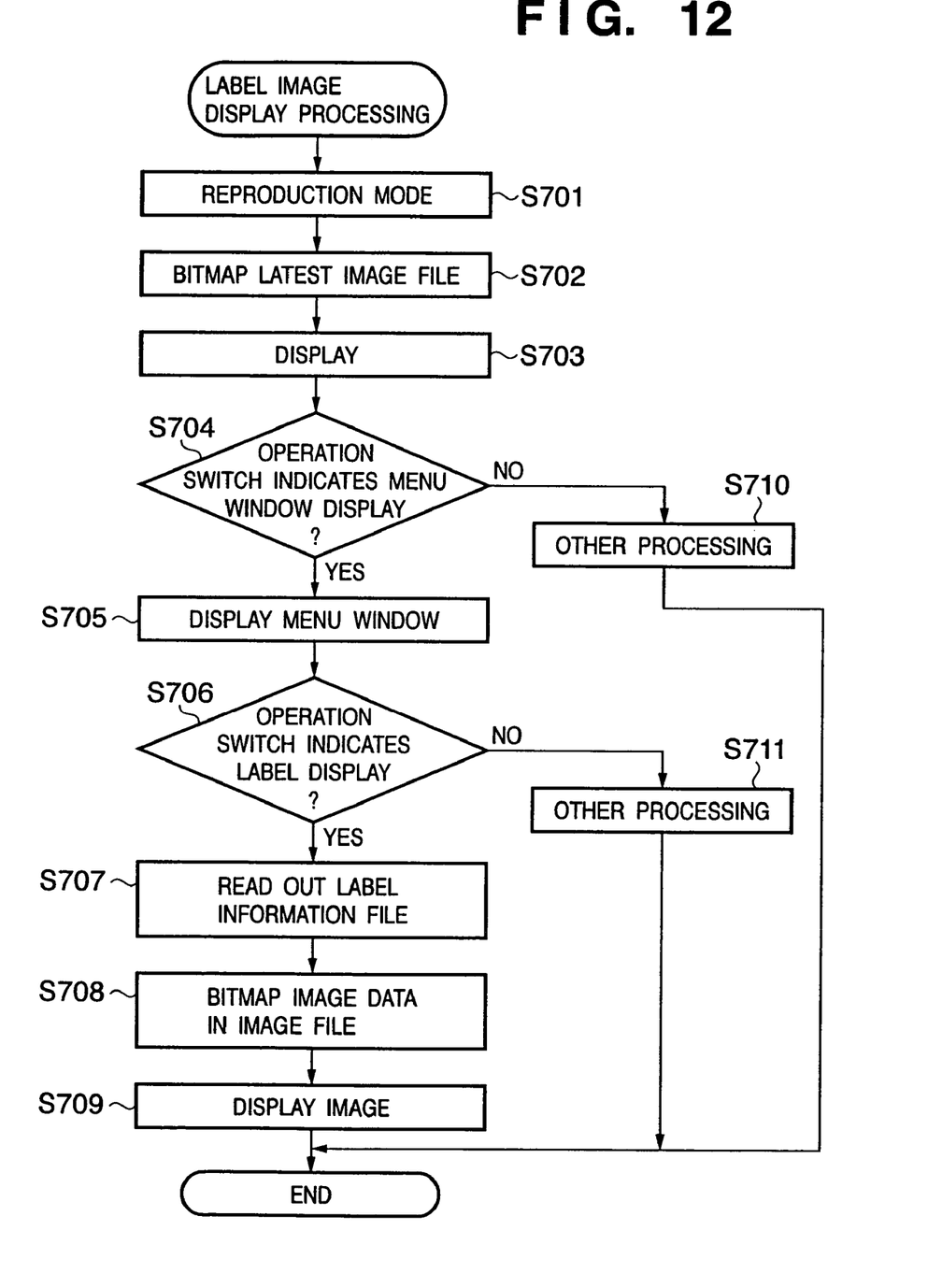
FIG. 12 is a flowchart showing the procedures of label image display processing executed by the digital camera shown in FIG. 3.

FIG. 12 is a flowchart showing the procedures of label image display processing executed by the digital camera shown in FIG. 3.

The digital camera 500 sets the operation mode to the reproduction mode (step S701) and bitmaps image data saved in the latest image file in the memory card 100 (step S702). The display circuit 1012 is activated to display the bitmapped image data on the display 1011 (step S703).

The digital camera 500 determines the state of the operation switch 1022 (step S704). When the operation switch 1022 indicates display of a menu window, the menu window is displayed (step S705). The digital camera 500 displays, in the menu window, a choice to display the label image of the memory card 100.

The digital camera 500 determines the state of the operation switch 1022 again (step S706). When the operation switch 1022 indicates display of the label image, the label information file is read out (step S707). An image file containing the file name of the label information file is read out. When the image data saved in the image file is bitmapped in the DRAM 1006 (step S708), the display circuit 1012 is activated to display the bitmapped image data on the display 1011 (step S709). The processing in steps S704 to S709 is repeated, and the processing is ended. With this processing, the same image as the label image can be displayed on the display 1011.

The object of the present invention is achieved even by supplying a storage medium (or recording medium) which records software program codes to implement the functions of the above-described embodiment to a system or apparatus and causing the computer (or CPU or MPU) of the system or apparatus to read out and execute the program codes stored in the information storage medium.

In this case, the program codes read out from the information storage medium implement the functions of the above-described embodiment by themselves, and the program codes and the information storage medium which stores the program codes constitute the present invention.

The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the information storage medium are written in the memory of a function expansion card inserted in the computer or a function expansion unit connected to the computer, and the CPU of the function expansion card or function expansion unit performs part or all of actual processing on the basis of the instructions of the program codes.

The program only needs to cause the computer to implement the functions of the above-described embodiment and can take any form such as an object code, a program code to be executed by an interpreter, or script data to be supplied to the OS.

As the information storage medium to supply the program, for example, a floppy (registered trademark) disk, hard disk, optical disk, magnetooptical disk, CD-ROM, CD-R, CD-RW, DVD-ROM, DVD-RAM, DVD-RW, DVD+RW, magnetic tape, nonvolatile memory card, or any other ROM can be used. The program is supplied by causing the user to download it from another computer or database (not shown) connected to the Internet, commercial network, or local area network.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-238706 filed on Aug. 18, 2004, which is hereby incorporated by reference herein.

What is claimed is:

1. A storage medium comprising:

storing means for storing externally input captured image data;

first display means for displaying a thumbnail image of captured image data stored in said storing means;

second display means for displaying attribute information of the storage medium, said second display means being separate from said first display means; and display control means for controlling said first display means to display the image corresponding to the captured image data stored in said storing means and said second display means to display the attribute information of the storage medium, wherein said first display means being provided on a first surface of the storage medium and said second display means being provided on a second surface of the storage medium, the first and second surfaces being on opposite sides of the storage medium.

2. The storage medium according to claim 1, wherein said display control means changes display on said first display means but does not change display on said second display means, when new captured image data is stored in said storing means.

3. The storage medium according to claim 1, wherein the attribute information is at least one of a brand of the storage medium and a recording capacity of the storage medium.

4. The storage medium according to claim 1, wherein the attribute information is a color to identify the storage medium.

5. The storage medium according to claim 1, wherein the storage medium is a memory card.

6. An information display method of a storage medium including storing means for storing externally input image data, first display means for displaying an image, and second display means for displaying attribute information of the storage medium, said first display means being on a first surface of the storage medium, said second display means being on a second surface of the storage medium, the first and second surfaces being on opposite sides of the storage medium, comprising:

a first display control step of controlling said first display means to display a thumbnail image of the captured image data stored in said storage means; and a second display control step of controlling said second display means to display attribute information of the storage medium.

7. A memory card comprising:

a storing unit configured to store externally input image data;

a first display unit configured to display a thumbnail image of captured image data stored in said memory card; and a second display unit configured to display attribute information of the memory card, wherein said first display unit and said second display unit being provided on opposite surfaces of the memory card.

* * * * *